United States Patent [19]

Takada

[11] Patent Number: 5,589,244
[45] Date of Patent: Dec. 31, 1996

[54] MAGNETO-OPTICAL DISC

[75] Inventor: Kunio Takada, Yokohama, Japan

[73] Assignee: Canon Kabushiki Kaisha, Tokyo, Japan

[21] Appl. No.: 192,749

[22] Filed: Feb. 7, 1994

[30] Foreign Application Priority Data

Feb. 16, 1993 [JP] Japan ................... 5-026932

[51] Int. Cl.$^6$ .................. G11B 5/66; B32B 3/02
[52] U.S. Cl. .............. 428/64.3; 428/64.7; 428/65.1; 428/694 ML; 428/694 ST; 428/694 SL; 428/900; 369/13; 369/110; 369/275.1
[58] Field of Search ............. 428/694 ML, 694 ST, 428/694 SL, 900, 64.3, 64.7, 65.1; 369/13, 110, 275.1

[56] References Cited

U.S. PATENT DOCUMENTS 4,841,501  6/1985  Izuka ........................... 369/13
4,877,666  10/1985  Muchnik ...................... 428/643

FOREIGN PATENT DOCUMENTS 0338913  10/1989  European Pat. Off. .

OTHER PUBLICATIONS

Patent Abstracts of Japan, Kokai No. 2–122443, vol. 14, No. 345, Jul. 1990.
Patent Abstracts of Japan, Kokai No. 3–86946, vol. 15, No. 266, Jul. 1991.

*Primary Examiner*—Leszek Kiliman
*Attorney, Agent, or Firm*—Fitzpatrick, Cella, Harper & Scinto

[57] ABSTRACT

A magneto-optical disc has a resin substrate and a magneto-optical film. A birefringence distribution of the substrate in a static state is so set that a disc phase difference during rotation of the disc is eliminated.

4 Claims, 6 Drawing Sheets

MAGNETO-OPTICAL DISC

BACKGROUND OF THE INVENTION

1. Field of the Invention

The present invention relates to a magneto-optical disc which is a mass storage information recording medium.

2. Related Background Art

The magneto-optical disc is a mass storage information recording medium for recording or reproducing information in such a process that a magneto-optical film having the magnetic Kerr effect is formed on a transparent substrate, a linearly polarized laser beam is irradiated onto the film through the substrate, and a fine angle of Kerr rotation caused by the magneto-optical film is read out. The disc of this type has a distribution of birefringence along the surface of its substrate. In using the disc, the birefringence causes a reflected laser beam to have a phase difference between an ordinary ray component and an extraordinary ray component thereof so as to become elliptically polarized light. It decreases the amplitude of magneto-optical signals, raising a problem of lowering the signal level. It is thus considered that the transparent substrate should preferably have birefringence as close to zero as possible.

Generally employed as materials for the transparent substrate are glass, epoxy resins, acrylic resins, and polycarbonate resins. Currently, the most generally used method for forming the substrate is the injection molding method, which is the highest in productivity. Popularly used among the resins, which are the polycarbonate resins stablest in heat resistance, water absorption property and other mechanical properties. The polycarbonate resins are materials which are normally considered to be liable to cause birefringence because of the orientation arising from the molecular structure thereof. However, various technical improvements achieved heretofore reduced the birefringence of polycarbonate substrates down to a level of nearly zero. For example, an improved polycarbonate resin has flowability several times higher than the polycarbonate resins of general-purpose grade, which greatly reduced the birefringence. On the other hand, the injection molding machine has been improved to develop a disc molding machine with high-speed and high-responsibility injection capability, enabling stable molding. Also, a disc mold or die is improved so as to permit uniform control of die temperature and to obtain suitable gate cross section and disc gate cutting, so that the birefringence can be made nearly zero even with the substrate being made of the polycarbonate resin.

The inventors of this application have made magneto-optical disc substrates of a polycarbonate resin low in birefringence utilizing the above conventional technology and investigated signal properties for discs made by forming a magneto-optical recording film on each of the substrates. The investigation clarified that the discs of the polycarbonate substrates were slightly lower in amplitude of magneto-optical signals than glass discs.

The trend discussed above becomes more enhanced as the rotational frequency of the disc increases, which heretofore rendered the polycarbonate resins unsuitable for use in high speed rotation. The investigation by the inventors of this application found the following cause of such a reduction in signal level during rotation at high speed. The centrifugal force caused by the high speed rotation produces the birefringence inside the substrate, which acts in a direction to adversely affect the plane of polarization of linearly polarized light used in an optical system in an employed drive.

SUMMARY OF THE INVENTION

It is an object of the present invention to provide a magneto-optical disc comprising a magneto-optical disc substrate and a magneto-optical film, which is so set that a phase difference of the disc is kept at a level of zero during rotation of the disc.

The above object can be achieved by a magneto-optical disc comprising a resin substrate and a magneto-optical film, in which a birefringence distribution of the substrate in a static state is so set that a disc phase difference during rotation of the disc is kept at a level of substantially zero.

In the above expression, the term "during rotation of the disc" means "while the disc is rotated at a rotational frequency of the disc for recording or reproducing information in or from the disc." Also, the term "disc phase difference" means "a phase difference between an ordinary ray component and an extraordinary ray component of a reflected beam from said disc".

DETAILED DESCRIPTION OF THE PREFERRED EMBODIMENTS

Figure 1:
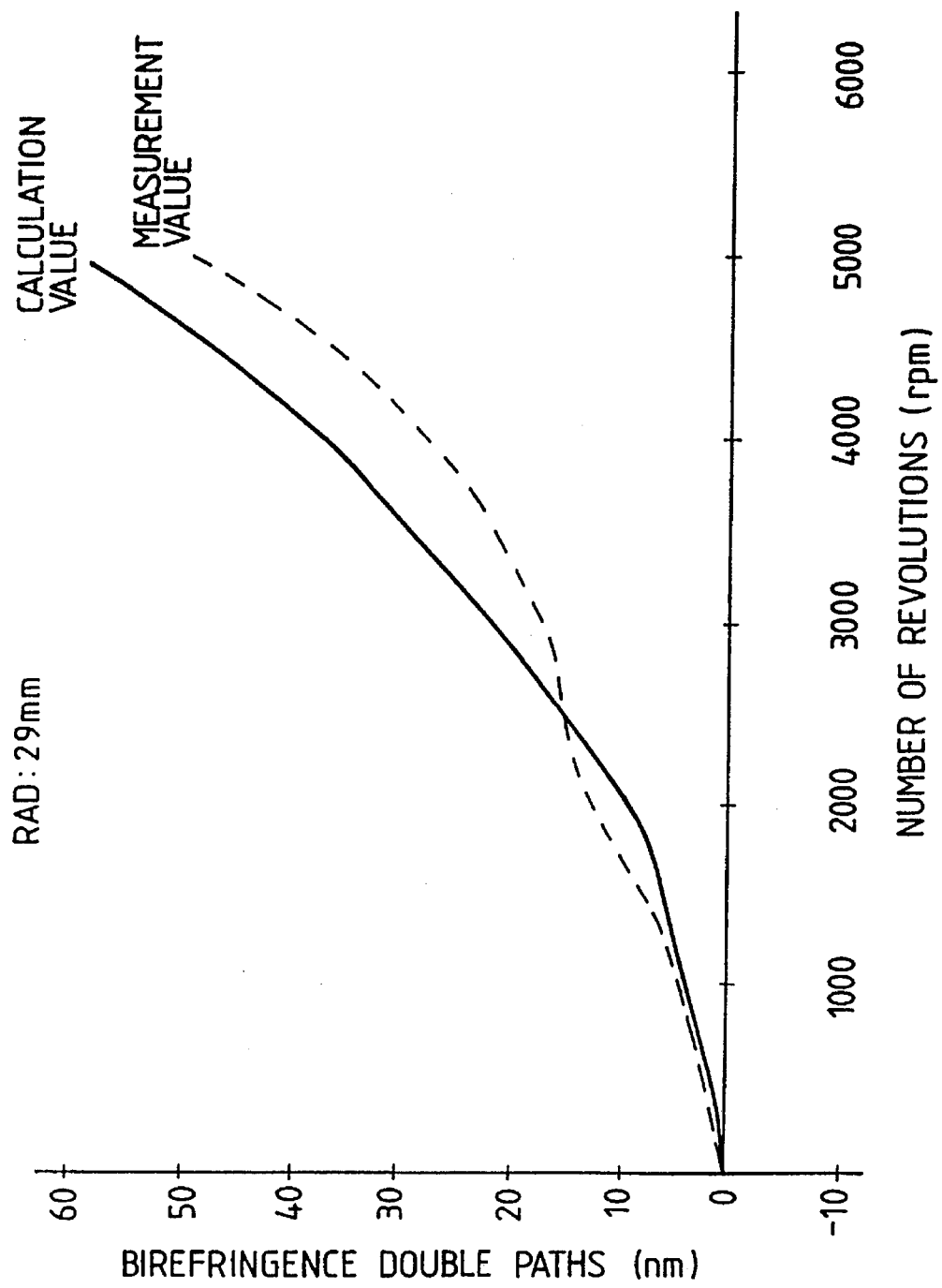
FIG. 1 is a graph of substrate birefringence caused by rotation at a position of a radius of 29 mm on a disc.

In the present invention, a centrifugal force is calculated according to a rotational frequency; a birefringence caused in a substrate thereby is estimated by formulas of stresses and photoelasticity; the substrate is preliminarily arranged to have a distribution of birefringence to cancel the estimated birefringence during rotation, so that the birefringence (phase difference) of the substrate can be made zero when the rotation reaches a desired rotational frequency (rotational frequency in recording or reproducing information). In a case of a magneto-optical film having a phase difference, the substrate is preliminarily arranged to have a distribution of birefringence to cancel the birefringence (phase difference) caused by the rotation and the phase difference of the film, whereby an obtained level of magneto-optical signals can be improved.

The inventors of the subject application further found in measurements that the birefringence due to the centrifugal force appearing according to the rotational frequency of the substrate differs in direction (sign) depending upon the plane of polarization of linearly polarized light in the operating drive. Then, in forming a disc substrate, the substrate is arranged to have a birefringence which can cancel the sign and quantity of birefringence caused by the centrifugal force during rotation, so that the amplitude of magneto-optical signals may be kept at a maximum during rotation of the disc.

When a material with a large photoelastic constant is rotated at high speed, the centrifugal force produces radial and circumferential principal stresses inside the substrate. Then, a difference between the principal stresses causes the birefringence. From the general knowledge in strength of materials, the radial and circumferential principal stresses, which are produced inside a doughnut-shaped disc by centrifugal force, are expressed by the following relations of Equations (1) and (2).

$$\sigma_r = \frac{1}{8}(3+v)\left(R_1^2 + R_2^2 - \frac{R_1^2 R_2^2}{r^2} - r^2\right)\frac{\gamma\omega^2}{g} \quad (1)$$

$$\sigma_t = \frac{1}{8}\left\{(3+v)\left(R_1^2 + R_2^2 + \frac{R_1^2 R_2^2}{r^2}\right) - \frac{(1+3v)}{3+v} \cdot r^2\right\}\frac{\gamma\omega^2}{g} \quad (2)$$

In the above equations, $R_1$: inner radius of the disc;

$R_2$: outer radius of the disc;

$\omega$: rotational angular velocity;

$v$: Poisson's ratio;

$\gamma$: specific gravity;

g : acceleration of gravity;

$\sigma_t$: circumferential principal stress at radius r;

$\sigma_r$: radial principal stress at radius r.

Further, the birefringence caused by the stresses is expressed by Equation (3).

$$\Delta n = C \cdot \Delta\sigma = C(\sigma_t - \sigma_r) \quad (3)$$

In Equation (3), $\Delta n$: birefringence caused by the stresses;

C: photoelastic constant;

$\Delta\sigma$: difference between the principal stresses.

Table 1 shows photoelastic constants of various plastic materials.

TABLE 1

|  | PC | PMMA | Epoxy resins |
|---|---|---|---|
| Photoelastic constant ($10^{-3} cm^2/dyn$) | 68 | −3 | 7 to 28 |

Table 2 lists calculated values of birefringence at some radial positions and in the range of rotational frequency of from 1800 rpm to 5000 rpm, applying the above equations to a disc of a polycarbonate resin in dimensions of inner radius 7.5 mm, outer radius 65 mm and thickness 1.2 mm.

TABLE 2

Disc rotational frequencies, and calculated values of birefringence double paths (nm)

| Rotational frequency | Radius r (mm) | | | |
|---|---|---|---|---|
| (rpm) | 29 | 41 | 51 | 61 |
| 1800 | 7.5 | 5.2 | 5.2 | 5.8 |
| 2400 | 13.4 | 9.3 | 9.2 | 10.3 |
| 3000 | 20.9 | 14.6 | 14.3 | 16.2 |
| 4000 | 37.2 | 25.9 | 25.4 | 28.7 |

TABLE 2-continued

Disc rotational frequencies, and calculated values of birefringence double paths (nm)

| Rotational frequency | Radius r (mm) | | | |
|---|---|---|---|---|
| (rpm) | 29 | 41 | 51 | 61 |
| 5000 | 58.1 | 40.4 | 39.8 | 44.9 |

Figure 2:
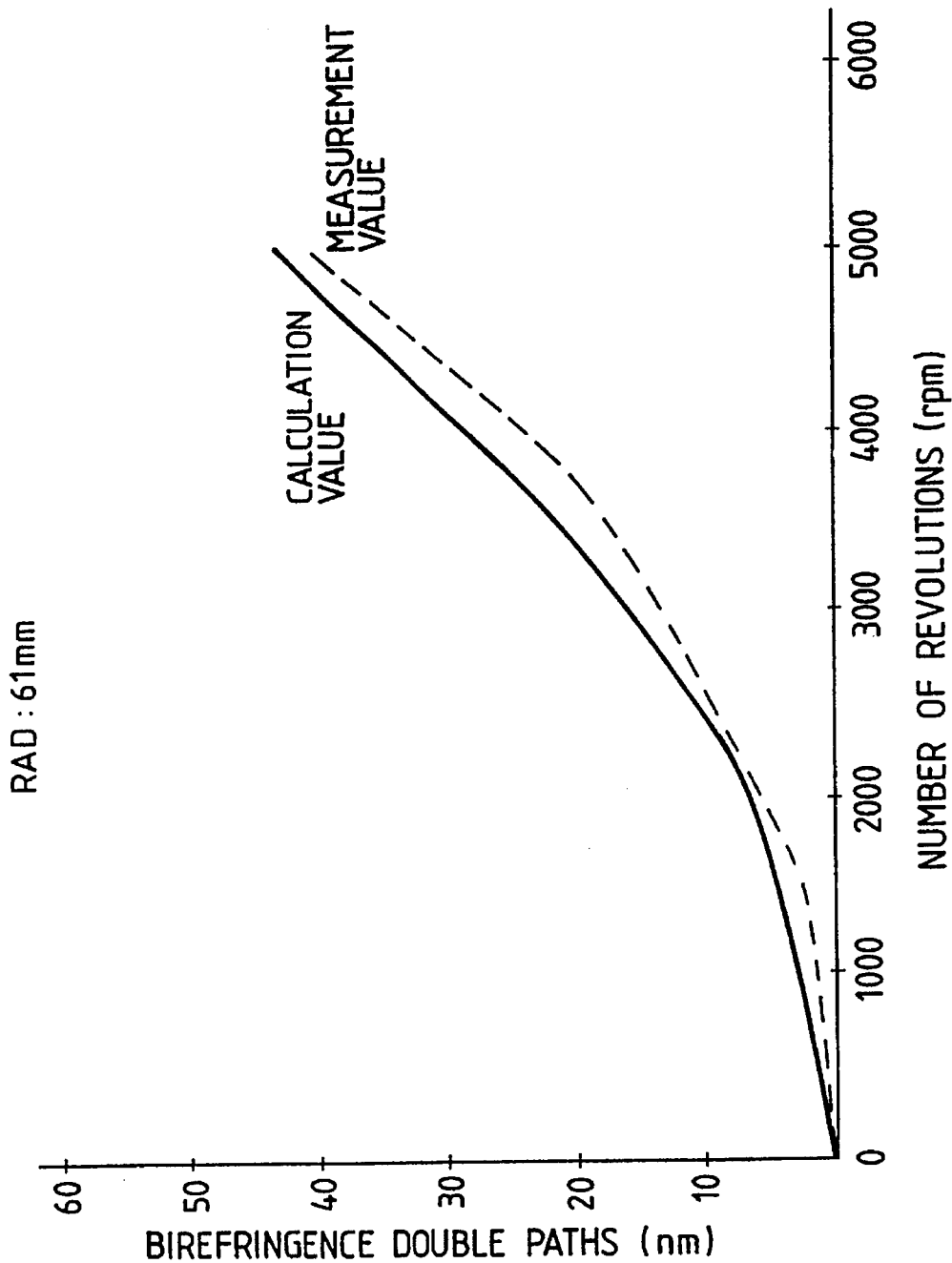
FIG. 2 is a graph of substrate birefringence caused by rotation at a position of a radius of 61 mm on a disc.

Further, the birefringence was measured at positions of a radius of 29 mm and a radius of 61 mm while rotating the substrate at each of the rotational frequencies in Table 2, and actual measurements were compared with the calculated values as listed in Table 2. The comparison results are shown in FIG. 1 and FIG. 2. From the graph in FIG. 2, it is seen that the actual measurements and calculated values are well coincident with each other at the position of a radius of 61 mm, which indicates that the above theoretical equations seem correct. It is, however, also understood from the graph in FIG. 1 that although the actual measurements and calculated values are well coincident with each other at the position of a radius of 29 mm up to 3000 rpm, the actual measurements of birefringence are slightly lower than the calculated values in the region of speed higher than that.

The present invention will be described in more detail with an example in which the operating rotational frequency of the drive is 2400 rpm.

As described above, even if a material high in orientation of molecules, such as the polycarbonate resins, is used for substrate, the birefringence distribution of a molded substrate thereof can be freely controlled to some extent at present by suitably adjusting the molding conditions by the improvement in molding material or by the improvement in molding machine or die. First molded was a substrate having a birefringence distribution of nearly zero level. Then, a recording film having a phase difference of nearly zero level was made on the substrate. While the thus produced disc was rotated by a drive which could be arbitrarily changed in rotational frequency and in plane of polarization of linearly polarized light, the phase difference was measured for the disc. The phase difference can be generally expressed by the unit of deg, rad or nm. The specification employs the unit of nm. Meanwhile, the birefringence is such a phenomenon that when linearly polarized light enters an object having optical anisotropy, it is split into two polarized light beams having orthogonal planes of polarization, which can be generally expressed as a difference between indices of refraction of the two polarized light beams, i.e., $\Delta n = |n_1 - n_2|$. When light enters a substrate having a thickness d (nm) having the birefringence, a phase difference between the two light beams can be expressed as $\Delta nd$ (nm). Here, the phase difference is synonymous with the birefringence and therefore the birefringence is expressed by $\Delta nd$ (nm).

Figure 3:
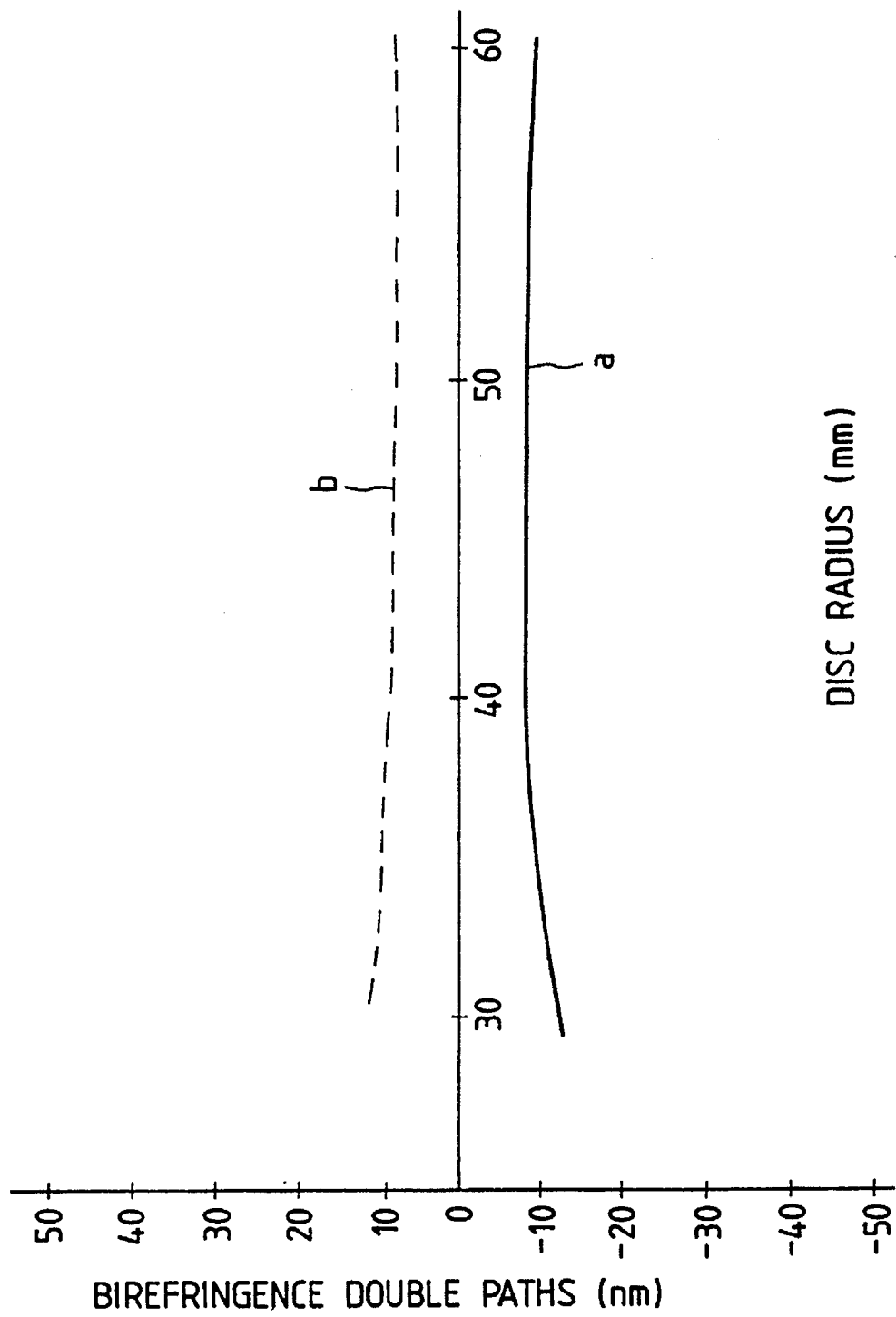
FIG. 3 is a drawing to show birefringence distributions of a substrate at a rotational frequency of 2400 rpm.
Figure 6A:
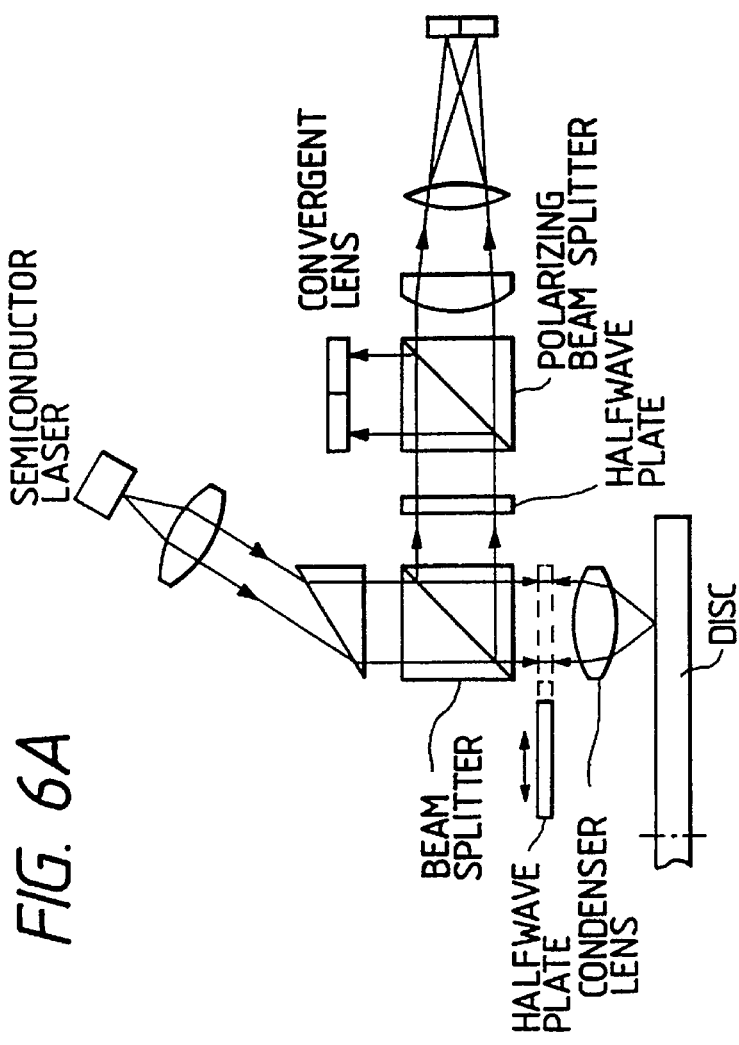
FIG. 6A is a schematic cross section of a measurement optical system.
Figure 6B:
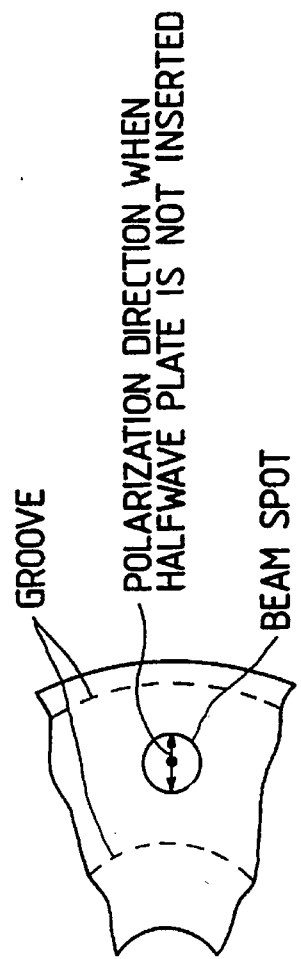
FIG. 6B is a drawing to show a state in which a beam spot is irradiated by the measurement optical system onto a disc.

FIG. 3 shows phase differences (birefringences) in the case when the disc is rotated at 2400 rpm. If a half-wave plate is not used in a drive having a measurement optical system in FIG. 6A, the direction of the polarization plane of linearly polarized light in the drive is parallel to the radial direction of the substrate, as shown in FIG. 6B. Measurement in this state provided a profile as shown by a in FIG. 3. When the half-wave plate is inserted in the drive having the measurement optical system in FIG. 6A, the direction of polarization plane in the drive turns parallel to the circumferential direction of the substrate. Measurement in this state provided a profile as shown by b in FIG. 3. If the disc should have had no birefringence of—the substrate and no phase difference of the film, the phase difference must have been zero in measurement in the drive. However, the measurement data in the graph of FIG. 3 shows that the absolute values of the phase differences are shifted about 10 nm irrespective of the direction of polarization plane in the drive. Since the phase difference of the recording film is determined by the film thickness and the index of refraction of the film, the phase difference is not affected by an external force applied onto the film. It was thus presumed that the change of 10 nm in measurement by the drive was an influence of birefringence caused by the centrifugal force during rotation of the substrate. A calculated value of birefringence appearing in the substrate during rotation at 2400 rpm is about 10 nm from Table 2, which is well coincident with the measured values using the drive. Therefore, it is understood that in a case of the rotation by the drive, the birefringence distribution is a sum of a birefringence distribution in a static state with the values in Table 2 obtained by the formulas of stresses and photoelasticity. Additionally, the direction of the change differs depending upon the direction of the polarization plane of linearly polarized light in the optical system in the drive. In more detail, the phase is shifted in the negative side when the polarization plane in the drive in FIG. 6A is aligned in the radial direction of the substrate and the phase is shifted on the positive side when the polarization plane is aligned in the circumferential direction of the substrate. Taking the above conditions into consideration, the substrate must be formed with a birefringence distribution to cancel a quantity of birefringence according to the rotational frequency and the direction (sign) changing depending upon the direction of polarization plane of the laser beam incident into the disc in the operating drive in order to keep the phase difference of the disc at zero level during rotation. Namely, if a drive employed has a plane of the polarization directed in the radial direction of hte substrate, a suitable substrate should have a distribution of birefringence scattered around +10 nm in the static state.

The present invention will be more specifically described with experimental examples.

The following description concerns molding of disc substrates suitable for cases in which the polarization plane of linearly polarized light in the optical system in the drive is aligned in the radial direction of the substrate.

There are various factors to determine the birefringence distribution of a molded substrate, for example, a resin temperature, a die temperature, an injection speed, a die clamping force, etc. An example shown herein is a method for controlling the birefringence distribution by the die temperature.

EXAMPLE 1

Figure 4:
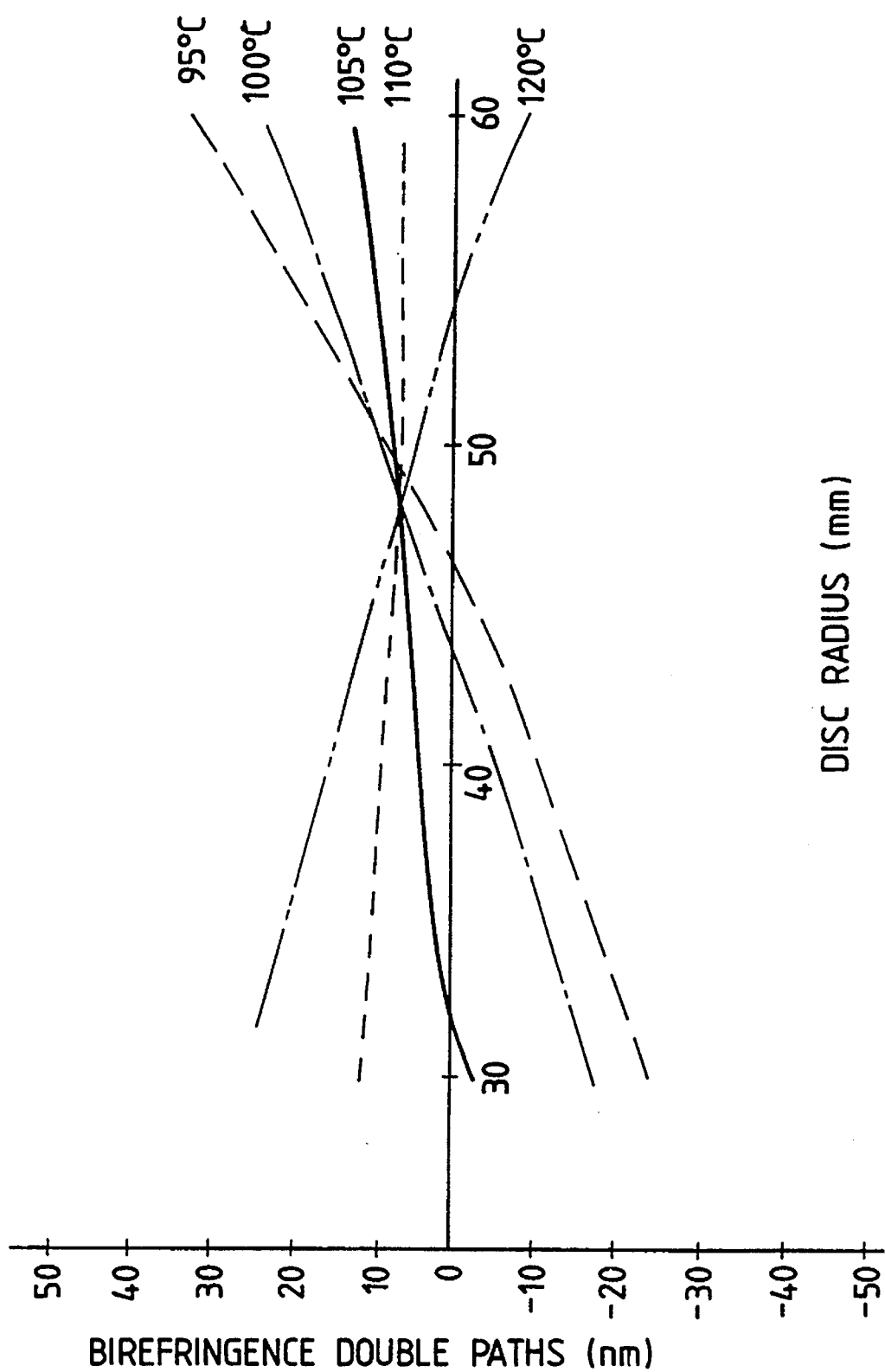
FIG. 4 is a drawing to show birefringence distributions at an injection speed of 150 mm/sec and at various die temperatures.

A relation between die temperature and birefringence was measured, and the measurement results are shown in FIG. 4. From the graph in FIG. 4, the birefringence is shifted to the positive side at an inner position but to the negative side at an outer position with a rise of die temperature. It was found that the molding should be carried out at a die temperature of 110° C. in order to obtain a substrate having the birefringence distribution as shown by b in FIG. 3, suitable for a magneto-optical disc rotating at 2400 rpm.

Then, a substrate was formed at each of the various die temperatures and a magneto-optical recording film was formed on each substrate. The amplitude of magneto-optical signals was measured for each of the thus formed discs. Table 3 shows the measurement results. The results are well coincident with the expectation from the graph in FIG. 4. The maximum amplitude of magneto-optical signals was observed with the substrate (No. 3) molded at a die temperature of 110° C.

TABLE 3

| Magneto-optical signal amplitudes | |
|---|---|
| Die No. (die temp.) | MO signal amplitude (V) |
| 1 (95° C.) | 27.0 |
| 2 (100° C.) | 27.7 |
| 3 (110° C.) | 29.0 |
| 4 (120° C.) | 28.2 |

The above results supported the estimation that in a case of the magneto-optical disc being used at 2400 rpm, the maximum amplitude of magneto-optical signals can be obtained in use of the substrate having the birefringence distribution of +10 nm in the static state so as to cancel the birefringence of −10 nm caused by rotation.

Although the phase difference of the magneto-optical film was nearly zero in Example 1, there could be a case in which the film must be used with an index of refraction and thickness of the film as shifted from those in the state of no phase difference in order to enhance various properties of the film in a good balance. In that case, the amplitude of magneto-optical signals can be made maximum by giving a substrate a distribution of birefringence to cancel both an increase of birefringence due to the centrifugal force and the phase difference of the film. For example, in a case of a film having a phase difference of −10 nm, since a disc of a diameter of 130 mm has a birefringence of −10 nm during rotation at 2400 rpm, a combined phase difference is −20 nm during rotation. Accordingly, a substrate employed should have a static birefringence of +20 nm.

EXAMPLE 2

As described above, the birefringence distribution of a substrate can be controlled by the resin temperature, the die temperature, the injection speed and the die clamping force. This example shows a case in which a substrate having a desired birefringence distribution is molded by adjusting the injection speed and the die temperature.

Figure 5:
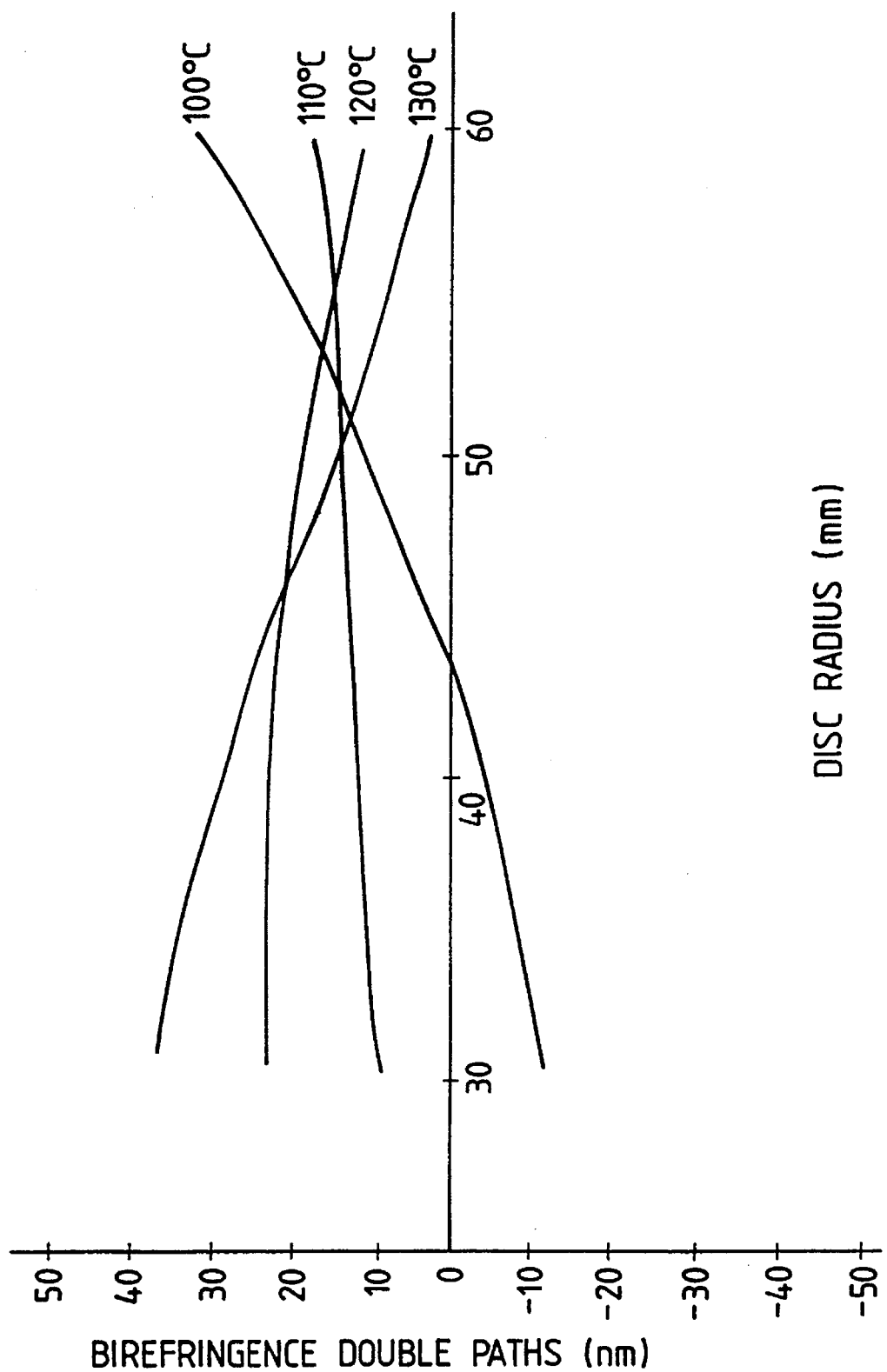
FIG. 5 is a drawing to show birefringence distributions at an injection speed of 180 mm/sec and at various die temperatures.

Conditions of injection speed and die temperature were investigated to stably obtain the birefringence of +20 nm in the static state over the entire area on a disc substrate, in which the birefringence was measured at an injection speed of 180 mm/sec and at various die temperatures. FIG. 5 shows the measurement results. From the graph in FIG. 5, it was expected that if a substrate having a birefringence distribution of +20 nm was produced by molding at a die temperature of 120° C., the amplitude of magneto-optical signals would be maximum at 2400 rpm for a magneto-optical disc obtained by forming a magneto-optical film having a phase difference of −10 nm on the substrate.

Then, substrates were actually molded at the injection speed of 180 mm/sec and at the various die temperatures, and a magneto-optical film was formed on each of the substrates. The amplitude of magneto-optical signals was measured at a rotational frequency of 2400 rpm for each of the thus obtained magneto-optical discs. The measurement results are shown in Table 4.

TABLE 4

Magneto-optical signal amplitudes
(with film having phase difference)

| Die No. (die temp.) | MO signal amplitude (V) |
|---|---|
| 5 (100° C.) | 26.8 |
| 6 (110° C.) | 27.9 |
| 7 (120° C.) | 28.8 |
| 8 (130° C.) | 28.1 |

The above table supported that the estimation was correct, because the amplitude of magneto-optical signals was maximum in a case of the substrate (No. 7) molded at a die temperature of 120° C.

Although the above examples showed the cases in which the operating rotational frequency was 2400 rpm, the birefringence occurrence distribution during rotation in a further higher speed range, for example, at a 5000 rpm, shows that the birefringence is 58.1 nm at radius of 29 mm but 44.9 nm at a radius of 61 mm (Table 2). Thus, the birefringence is some nanometers greater on the inner side. Therefore, when the actual operating rotation range is near this range, a slightly sloped birefringence is preferable as −58.1 nm on the inner side and −44.9 nm on the outer side.

As is apparent from the above results, a high amplitude of magneto-optical signals can be obtained by using a substrate having a birefringence distribution preliminarily to cancel the birefringence caused by the centrifugal force according to the operating rotational frequency in the direction of the polarization plane of the employed drive.

Further, when a magneto-optical recording film has a phase difference, a high amplitude of magneto-optical signals can also be obtained by using a substrate having a birefringence distribution in the static state to cancel both the phase difference of the film and an increase of birefringence caused by the rotation.

The experimental examples were described as the cases using the polycarbonate resin, but the present invention is also effective for cases using a substrate made of another material having optical anisotropy, for example, a polyolefin substrate or a polystyrene substrate.

What is claimed is:

1. A magneto-optical disc comprising a resin substrate and a magneto-optical film, wherein a birefringence distribution of said substrate in a static state is set so that a disc phase difference during rotation of the disc is eliminated.

2. A magneto-optical disc according to claim 1, wherein the birefringence distribution of said resin substrate is adjusted by controlling at least one of a resin temperature, a die temperature, an injection speed and a die clamping force in molding said substrate.

3. A magneto-optical disc according to claim 1, wherein the birefringence distribution of the substrate in the static state is set so as to cancel a birefringence caused by a centrifugal force appearing during the rotation of the disc, a positive or negative sign of the birefringence changing depending upon a direction of a plane of polarization of linearly polarized light applied to the disc by an optical system.

4. A magneto-optical disc according to claim 1, wherein the birefringence distribution of the substrate in the static state is set so as to cancel a phase difference of the magneto-optical film and a birefringence caused by a centrifugal force appearing during the rotation of the disc, a positive or negative sign of the birefringence changing depending upon a direction of a plane of polarization of linearly polarized light applied to the disc by an optical system.

* * * * *

UNITED STATES PATENT AND TRADEMARK OFFICE
CERTIFICATE OF CORRECTION

PATENT NO. : 5,589,244
DATED : December 31, 1996
INVENTOR(S) : Kunio TAKADA

It is certified that error appears in the above-indentified patent and that said Letters Patent is hereby corrected as shown below:

ON THE COVER PAGE

Under item [56] "References Cited"

U.S. PATENT DOCUMENTS:

"4,841,501  6/1985  Izuka ..........369/13
 4,877,666  10/1985  Muchnik ........428/643"
should read
--4,841,501  6/1989  Izuka ..........369/13
  4,877,666  10/1989  Muchnik ........428/643--.

COLUMN 1:

Line 30, "the resins, which are the polycarbonate resins stablest in heat" should read --the resins are the polycarbonate resins, which are the stablest in heat--.

UNITED STATES PATENT AND TRADEMARK OFFICE
CERTIFICATE OF CORRECTION

PATENT NO. : 5,589,244
DATED : December 31, 1996
INVENTOR(S) : Kunio TAKADA

It is certified that error appears in the above-indentified patent and that said Letters Patent is hereby corrected as shown below:

COLUMN 5:

Line 36, "hte" should read --the--.

Signed and Sealed this

Seventeenth Day of June, 1997

Attest:

BRUCE LEHMAN

Attesting Officer

Commissioner of Patents and Trademarks